May 12, 1936.  J. S. STULL  2,040,344

THREADING TOOL

Filed April 25, 1935

INVENTOR
J. S. STULL
BY E. R. Nowlan
ATTORNEY

Patented May 12, 1936

2,040,344

UNITED STATES PATENT OFFICE 2,040,344

THREADING TOOL

John S. Stull, Chicago, Ill., assignor to Western Electric Company, Incorporated, New York, N. Y., a corporation of New York Application April 25, 1935, Serial No. 18,147

6 Claims. (Cl. 10—89)

This invention relates to threading tools and more particularly to screw threading tool attachments for use on screw machines.

The primary object of this invention is to provide a simple, efficient, and readily adjustable threading tool.

In accordance with one embodiment of this invention as applied to screw machines, there is provided in a threading tool or die holder which is carried by a tool head arranged to move longitudinally of rotating work carried in a spindle of the machine, a threading die rotatably carried by the holder, means normally restraining the threading die from rotation during the threading operation, and means effective upon a predetermined longitudinal movement of the die holder relative to the work and/or the forming of a predetermined length of thread for rendering the restraining means ineffective to thereby permit rotation of the threading die with the work, thus terminating the thread forming operation.

Figure 1:
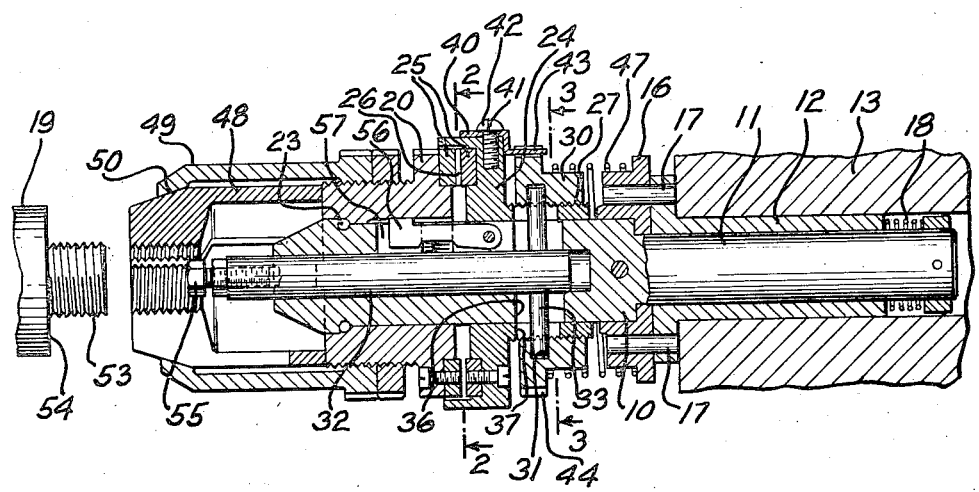
Figure 2:
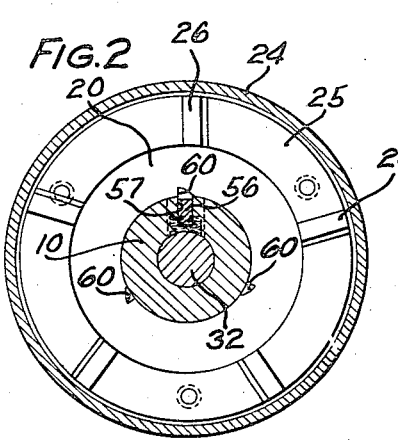
Figure 3:
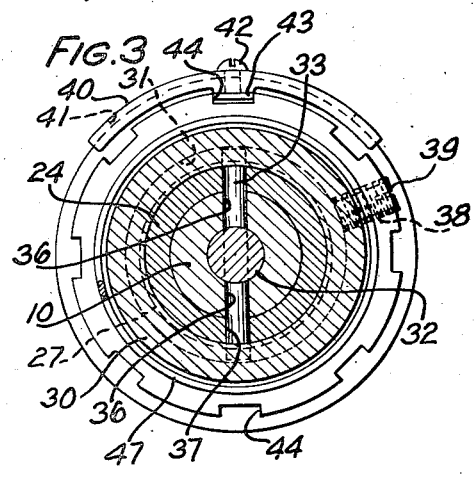
Figure 4:
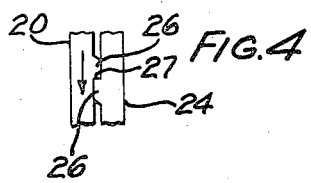

Other objects and advantages of this invention will more fully appear from the following detailed description taken in conjunction with the accompanying drawing wherein Fig. 1 is a central longitudinal section of an adjustable threading tool or die holder embodying the features of this invention as used on a screw machine, shown fragmentarily;

Figs. 2 and 3 are enlarged vertical sections taken on the lines 2—2 and 3—3 of Fig. 1, and Fig. 4 is a fragmentary detail view of the cooperating toothed clutch members.

Referring now to the drawing, 10 indicates a shouldered central body member formed with a shank portion 11 which is slidably carried in a shank sleeve 12, the latter being clamped in a conventional manner (not shown) within an aperture of a longitudinally reciprocable indexable tool head 13, fragmentarily shown, of a screw machine. Pinned to the body member 10 adjacent the shank portion 11 thereof is a shouldered collar 16 having fixed at diametrically opposite points pins 17 which slidably engage in apertures formed in an enlargement of the shank sleeve 12. A compensating spring 18 surrounds the shank portion 11 between a collar fixed thereto and the end of the shank sleeve 12 which serves to return the die holder to its original position (Fig. 1) relative to the tool head 13, if there should be any tendency of the holder to draw away from the work or stock, indicated at 19, due to irregularities in the forward movement of the tool head during the threading operation. The stock 19 in the operation of the screw machine is rotated by a usual chuck operatively associated with a continuously rotating spindle (not shown) of the machine.

Mounted for rotation and having a limited sliding movement on the left end of the body member 10 is a clutch member 20, a series of balls 23 being fitted between cooperating shoulders of the body member and the clutch member to reduce friction therebetween and prevent longitudinal movement toward the left (Fig. 1) of the clutch member on the body member. Slidably fitted on the body member 10, for a limited movement toward the right, is a second clutch member 24, each of the clutch members having fixed to inner opposed shouldered end faces thereof ring shaped inserts 25 provided with clutch teeth 26. The teeth 26, as clearly shown in Fig. 4, have shallow, sharply defined parallel cooperating faces 27 extending parallel to the axes of the clutch members 20 and 24 so that a slight axial movement of the clutch member 20 on the body member 10 away from the clutch member 24 will cause a disengagement of the cooperating clutch teeth 26.

Threaded onto the periphery of a reduced portion of the clutch member 24, as indicated at 27, is a shouldered collar 30 formed in its inner periphery with an annular channel 31. Reciprocably carried in an axial bore of the body member 10 is an abutment member 32 to which is fixed a pin 33, opposite ends of which pass through elongated slots 36 and 37 extending longitudinally of and formed in the opposite walls of the body member and the reduced portion of the clutch member 24, respectively, the extreme outer ends of the pin fitting within the annular channel 31 of the collar 30. To assemble the pin 33 and the abutment member 32 the abutment member is rotated in the body member 10 until the aperture thereof for receiving the pin is alined with a counter bored aperture 38 (Fig. 3) extending from the periphery of the collar 30 into the annular channel 31. The pin 33 is then inserted through the aperture 38 and driven into the alined aperture of the abutment member 32 to the position shown in the drawing. Thereafter a screw 39 is threaded into the aperture 38 to close the aperture. The width of the slots 36 and 37 is such that the pin 33 may be freely moved therealong but rotary movement of the clutch member 24 and the abutment member 32 relative to the body member 10 is prevented. By rotating the collar 30 in one direction or the other upon the threaded periphery of the reduced portion of the clutch member 24 the pin 33 riding in the channel 31 of the collar will have movement imparted thereto and through its connection to the abutment member 32 the latter will be moved longitudinally to vary the position of the left end thereof, for a purpose to be explained fully hereinafter.

Adjustably carried upon the periphery of the clutch member 24 is a retaining member 40 for the collar 30, the retaining member being formed with an elongated slot 41 through which passes a screw 42 for clamping it in its adjusted position, the retaining member being formed with a finger 43 arranged to engage in one or another of a plurality of peripheral notches 44 in the collar 30. In adjusting the collar 30 to vary the position of the left end of the abutment member 32 the screw 42 is loosened sufficiently to release the finger 43 from the alined notch 44 of the collar and after threading the collar in one direction or another the required distance upon the reduced portion of the clutch member 24, the retaining member 40 is moved along the periphery of the clutch member, which is permitted by the elongated slot 41, until the finger 43 registers with the nearest notch 44 and thereafter the screw is tightened to clamp the member 40 in position wherein the finger thereof will retain the collar 30 and the abutment member, which move in unison, in their adjusted position.

The clutch members 20 and 24 are normally held in yieldable clutching engagement by a coiled compression spring 47 engaging at opposite ends the shouldered collars 16 and 30. The spring 47 acting against the collar 30 which is threadedly connected to the longitudinally movable clutch member 24 holds the latter in engageable clutch member with the clutch member 20. It will be noted that the opposed adjacent ends of the clutch member 24 and the collar 16 are normally spaced apart a distance slightly greater than the length of the cooperating teeth faces 27 of the clutch members in order that the clutch members may be separated such a distance as to completely disengage the clutch teeth.

A threading die 48 of the split spring type is clamped against the left end face of the normally non-rotatable clutch member 20 by a clamping collar 49 peripherally threaded onto a reduced portion of the clutch member, the collar and the die being formed with inner and outer cooperating tapered faces, respectively, indicated at 50, which upon threading the collar onto the clutch member serve to firmly clamp the die in axial alinement with and against the clutch member 20.

The work or stock 19 carried in the continuously rotating spindle of the machine is shown with a reduced portion 53 which forms a shoulder 54, this operation on the stock having been formed in a previous operation of the screw machine in a well known manner. In the particular article to be formed from the stock 19 it is necessary that the reduced portion 53 be provided with a right hand thread extending along its entire length to within a very few thousandths of an inch from the shoulder 54. This may be readily accomplished by the threading die holder above described in the following manner.

In setting up the herein described threading tool or die holder to form a desired length of thread, such as that previously described, for the reduced portion 53 of the stock 19, the left end face of the abutment member 32 which is equipped with an adjustable screw 55, and which forms the end face, is set in from the left end face of the die 48 a distance equal to the desired length of the thread to be formed minus the length of the cooperating faces 27 of the clutch teeth 26. This adjustment of the abutment member 32 is effected, as previously described, by releasing the retaining finger 43 from the notched periphery of the collar 30 and thereafter threading the collar in one direction or the other upon the clutch member 24, the abutment member moving in unison therewith. To provide a very close adjustment of the end face of the abutment member 32 relative to the end face of the die 48 the screw 55 is threaded in one direction or the other upon the abutment member.

In the operation of a screw machine equipped with the improved threading tool or die holder, assuming that the work or stock 19 is being rotated in a clockwise direction as viewed looking toward the die holder from the left end of Fig. 1, and the tool head 13 has been indexed to aline the die holder with the axis of the reduced portion 53 of the stock, the tool head next moves forward and operatively engages the die 48, clamped to the non-rotatable clutch member 24, with the reduced rotating stock portion 53 and commences the threading thereof. Since the clutch members 20 and 24 are slidably carried upon the body member 10 and urged toward the left (Fig. 1) by the spring 47 with their movement toward the right being limited by the space between the opposed adjacent ends of the clutch member 24 and the collar 16 it will be aparent that the threading operation starts under spring pressure.

In the continued forward movement of the tool head 13 with the die holder the threading operation continues and after a predetermined length of thread has been formed, which will be the entire length of the stock portion 53 except for a short portion thereof substantially equal to the length of the cooperating faces 27 of the clutch teeth 26, the screw 55 in the end of the reciprocably carried abutment member 32 stops against the end face of the work portion 53. Thereafter with the abutment member 32 and the clutch member 24 prevented from moving forward the tool head 13 and the die holder continue their forward stroke, the threading operation continuing until the clutch teeth 26 of the clutch members 20 and 24 have been positively separated which is effected by the withdrawal of the clutch member 20 from the clutch member 24 connected by means of the collar 30 and the pin 33 to the now stationary abutment member 32.

With the clutch members 20 and 24 completely disengaged rotation of the stock 19 relative to the die 48 ceases since the clutch member 20 carrying the die is now free to rotate upon the body member 10 at which instant the desired length of thread upon the reduced stock portion 53 is completed, the thread extending to within a few thousandths of an inch from the shoulder 54 thereof. It is to be understood that the forward stroke of the tool head 13 and the die holder is such that it is completed when the outer end face of the die 48 is within a few thousandths of an inch from the shoulder 54, or upon completion of the threading operation, so that no marring of the work takes place, such as would occur, if the rotating work was engaged with the end face of the die which is non-rotatable during the threading operation. The usual reversal in direction of rotation of the stock 19 now takes place to effect an unthreading of the threaded portion 53 from the die 48 as the tool head moves backward in timed relation therewith. To prevent the die 48 from rotating during this unthreading operation a second clutch is included in the die holder. This second clutch (Figs. 1 and 2) comprises a spring pressed pivotal pawl 56 carried in a longitudinal slot 57 formed in the periphery of the body member 19, the operative end of the pawl engaging ratchet grooves 60 formed in the inner periphery of the clutch member 20. During the unthreading of the die 48 from the threaded stock portion 53 which receives a counter-clockwise rotation, at this time, assuming that a right hand thread has been formed on the portion 53, the pawl 56 engaging in one or the other of the ratchet grooves 60 will lock the clutch member 20 and the die 48 clamped thereto from rotating. When the clutch member 20 and the die 48 are free to rotate with the stock portion 53 at the termination of the threading operation and before the unthreading operation begins the pawl 56 rides out of and into the grooves 60.

In the case of threading hollow work or stock the abutment member 32, or an extension thereof, will be arranged to stop against some non-reciprocable part of the chuck or spindle carrying the stock.

From the above description it is believed to be clear that the improved threading tool or die holder is simple in structure and one which may be readily adjusted to cause a desired length of thread to be cut, particularly where the length of the thread is to be held within close limits such as extending to a shoulder on a workpiece. The herein described threading die holder further includes the feature of starting the threading operation under spring pressure.

It will be understood that the embodiment herein described is merely illustrative of the invention, which is limited only by the terms of the appended claims.

What is claimed is:

1. In a threading tool, a holder, cooperating longitudinally separable clutch elements thereon, a threading die carried by one of said elements, spring pressed means including the other of said elements and a collar adjustably threaded thereon normally restraining said die and its associated element from rotation relative to said holder, and an abutment member operatively connected to said collar of the restraining means and arranged to stop against a work piece being threaded when a predetermined length of thread has been formed thereon during a relative rotary and longitudinal movement between said die and the work piece, the stopping of said member thereafter in the continued relative advance of the tool and the work piece rendering said restraining means ineffective and thereby causing a separation of said clutch elements at which instant the desired length of thread will have been formed.

2. In a threading tool, a body member, cooperating clutch elements relatively longitudinally separable and normally spring urged into clutching engagement carried upon said member, one of said elements being free to rotate upon the body member when disengaged from said other element, a threading die carried by said element which is free to rotate when disengaged, a collar adjustably threaded upon said other element, and means operatively connected to said collar arranged to stop against a work piece being threaded after a predetermined length of thread has been formed thereon by a relative rotary and longitudinal operative movement between the work piece and the tool, the stopping of said means thereafter in the continued advance of the tool effecting a separation of said clutch elements at which instant the desired length of thread will have been formed.

3. In a threading tool, a body member, cooperating clutch elements upon said member, one of said elements being non-rotatable relative to and normally yieldably urged in a longitudinal direction into clutching engagement with said other element, said other element being normally non-rotatable but free to rotate upon the body member when disengaged from said non-rotatable element, a threading die carried by said normally non-rotatable element, a collar adjustably threaded upon said non-rotatable element, and means operatively connected to said collar on the non-rotatable longitudinally urged element arranged to stop against a work piece after a predetermined length of thread has been formed thereon by a relative rotary and longitudinal operative movement between the work piece and the tool, the stopping of said means thereafter effecting a separation of said clutch elements at which instant a desired length of thread will have been formed.

4. In a threading tool, a body member carried by a reciprocable machine element, cooperating clutch members upon said member, one of said clutch members being non-rotatable and longitudinally movable relative to the other, yieldable means effective to normally urge said non-rotatable clutch member into clutching engagement with the other of said clutch members, said other clutch member being normally non-rotatable but free to rotate upon disengagement from said non-rotatable clutch member, a threading die carried by said other clutch member in alinement with a rotating work piece, a collar adjustably threaded upon said non-rotatable element, and means operatively connected to said collar on the non-rotatable longitudinally movable clutch member and arranged to stop against the work piece during a reciprocable movement of the tool after a predetermined length of thread has been formed on the work piece, the clutch member thereafter starting to disengage and at the termination of said disengagement the desired length of thread will have been formed.

5. In a threading tool, a body member, cooperating toothed clutch elements relatively movable out of clutching engagement carried upon said member, a collar adjustably threaded upon one of said elements, a spring operatively associated with said collar on the element for normally urging the elements into engagement, the other of said elements being free to rotate upon the body member when disengaged from said other element, a threading die carried by said element which is free to rotate upon disengagement from said other element, and an abutment member operatively connected to said collar on the spring urged element arranged to stop against a rotating work piece being threaded after a predetermined length of thread has been formed thereon effected by a longitudinal advance of the die holder, the stopping of said abutment member with the continued advance of the tool causing a disengagement of the teeth of said clutch elements at which instant the desired length of thread will have been formed.

6. In a threading tool, a holder, cooperating axially arranged longitudinally separable clutch elements thereon, a threading die carried by one of said elements, means including the other of said elements for normally restraining said die and its associated element from rotation relative to said holder, clutch actuating means comprising an abutment member slidable in said holder and arranged to stop against a work piece being threaded after a predetermined length of thread has been formed thereon by a relative rotary and longitudinal operative movement between the work piece and the tool, a collar adjustably threaded upon said second clutch element having formed in its inner periphery an annular channel, and a pin carried by said abutment member extending through elongated slots formed in and extending longitudinally of said holder and second clutch element and slidably engaged in the annular channel of said collar, said collar and pin forming an operative connection between the second clutch element and the abutment member whereby the latter may be adjusted longitudinally relative to the work for actuating the clutch means after a predetermined length of thread has been formed thereon.

JOHN S. STULL.